United States Patent [19]

Nguyen

[11] Patent Number: 5,960,185

[45] Date of Patent: *Sep. 28, 1999

[54] METHOD AND APPARATUS FOR WAFER DISPOSITION BASED ON SYSTEMATIC ERROR MODELING

[75] Inventor: Trang Diem Nguyen, Saratoga, Calif.

[73] Assignee: International Business Machines Corporation, Armonk, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/671,143

[22] Filed: Jun. 24, 1996

[51] Int. Cl.$^6$ ............................................. G06G 7/48
[52] U.S. Cl. ......................... 395/500.1; 395/500.09; 395/500.15
[58] Field of Search .................... 364/578, 488, 364/490; 395/500

[56] References Cited

U.S. PATENT DOCUMENTS

| | | | |
|---|---|---|---|
| 4,583,298 | 4/1986 | Raugh | 33/502 |
| 5,355,306 | 10/1994 | Waldo, III | 364/167.01 |
| 5,434,956 | 7/1995 | Son et al. | 395/105 |
| 5,777,901 | 7/1998 | Berezin | 364/578 |

*Primary Examiner*—Kevin J. Teska
*Assistant Examiner*—Thuan Do
*Attorney, Agent, or Firm*—Khanh Q. Tran

[57] ABSTRACT

A wafer-disposition method and apparatus are disclosed where the disposition is based on a model of systematic misalignment errors. The method comprises the steps of: modeling the misalignment errors between the mask and wafer as a mathematical model using measured misalignment data, generating a confidence limit of the probability of defect for the wafer, and determining whether the wafer satisfies a predetermined product quality level by comparing the confidence limit to the tolerance specification for the wafer. The misalignment model includes systematic errors and is represented by a polynomial based on the location of test points on the wafer. Preferably, several polynomials are formed and one that best predicts new misalignment data is selected. The confidence limit is created by combining the estimated probabilities of defect for all sliders in the wafer. Also, the product quality determination is based on a variable acceptance sampling procedure using the mathematical model.

36 Claims, 6 Drawing Sheets

METHOD AND APPARATUS FOR WAFER DISPOSITION BASED ON SYSTEMATIC ERROR MODELING

FIELD OF THE INVENTION

The present invention relates in general to the field of electronic device manufacturing using photo-lithography. More particularly, the present invention relates to a method and apparatus for disposition of wafers used in making the devices, based on the modeling of systematic errors.

BACKGROUND OF THE INVENTION

In the manufacturing of electronic devices such as integrated circuits or magneto-resistive (MR) heads for use in data storage systems, a photo-lithography system is normally employed for transferring device features from a device mask to a wafer (or substrate) from which the devices are to be made. Generally, the performance of the manufactured devices is heavily dependent on minimizing the mask to wafer superposition errors during this photo-lithography process. It is therefore critical that any misalignments between the mask and the wafer being used for making the devices are accurately predicted and detected so that the wafer can be properly accepted or rejected in the final disposition of the wafer.

An example of photo-lithography systems is described in U.S. Pat. No. 4,803,712, issued to Kembo et al., for "X-Ray Exposure System." For reference purposes, the diagram of a prior art photo-lithography system shown in the U.S. Pat. No. 4,803,712 is reproduced here as a system 1 in FIG. 1 with certain non-essential elements omitted. The system 1 comprises a frame 2 placed on a floor 11, an X-ray source 3 mounted on the frame 2, a mask alignment apparatus 9 for aligning a mask 6 and a wafer 7, and a bed 10 supporting the mask alignment apparatus 9 thereon. The X-ray source 3 radiates X-rays from a fixed X-ray generating point on a rotary cathode 4 onto mask 6 to expose a device pattern on the wafer.

FIG. 2 shows an exemplary semiconductor wafer 7 from which the features of the electronic devices are fabricated using the system 1 of FIG. 1. The wafer 7 is divided into a large number of sliders (also referred to as dies) 15 by scribe lines 14. A slider 15 is a portion of the wafer 7 from which an electronic device will be made. A flat edge 13 of the wafer 7 defines the orientation of the wafer while it is being processed. A set of the sliders 15 is used in measuring the mask-wafer misalignment and referred to as test points 16.

In order to assess the misalignment errors, a specialized microelectronic instrument is typically employed for measuring the magnitude and direction of the errors of the test points 16. Such a measuring instrument may be a Quaestor Q2 semiconductor optical metrology system manufactured by the Bio-Rad Micromeasurements Inc. of Mountain View, Calif.

The error measurements for the wafer 7 are used in two important areas. First, the misalignments provide information about the sources of errors occurring in the operation of the mask alignment apparatus in the photo-lithography system. This information permits appropriate alignment actions to be taken for minimizing the mask-to-wafer misalignment. The errors that affect the whole wafer are commonly referred to as systematic errors and typically occur due to translation, rotation, magnification, or dimensional changes of the photo mask in relation to previous masking operations. The systematic errors also include lateral distortions of the wafer during manufacturing which cause random shifts of the device features. Typically, the systematic errors for each wafer must be estimated based on the measured misalignments for its test points 16.

FIGS. 3 and 4 illustrate different types of misalignment between the wafer 7 and mask 6, and their respective sources. FIG. 3 shows the relative positions of a mask plane 22 in which the mask 6 would be positioned (not shown), a wafer plane 20 in which a wafer 7 would be positioned (not shown), and a lens assembly 21 for projecting the device features from the mask 6 onto the wafer 7. FIG. 4 illustrates some typical misalignment errors between the mask 6 and the wafer 7, and the sources of these errors.

In addition to mask alignment, the measured misalignments are considered in the disposition of the wafer 7 in accordance with its predetermined tolerance specifications. For instance, the assessed misalignment of the wafer is compared to its tolerance limits and the wafer is accepted or rejected, depending on whether the misalignment is within the acceptable limits. Usually, the manufacturer of the electronic devices is committed to achieve a certain quality level for its products. To insure this quality, a variable acceptance sampling procedure is normally used during the fabrication of the devices wherein the wafer 7 is accepted or rejected based on the sampled data. Common acceptance sampling procedures are described, for example, by A. J. Duncan in "Quality Control and Industrial Statistics," Irwin, 1986.

Prior art wafer disposition methods typically assume that the misalignments of the test points 16 have a common normal distribution with the same mean and standard deviation. That is, $d_i \sim N(\mu, \sigma^2)$ where $d_i$ is the misalignment of the i-th test point in a direction in the wafer plane 20, and the mean $\mu$ and standard deviation $\sigma$ are unknown parameters. Using a specialized measuring instrument such as the Quaestor Q2 referred to above, the misalignments for n number of test points 16 are first obtained. The average misalignment d and sample standard deviation s are then calculated based on the measured misalignments of the test points 16.

The wafer 7 is accepted if the conditions (d−ks>L) and (d+ks<U) are satisfied, where L and U are the lower and upper bounds, respectively, of the specified tolerance specifications. The constant k is calculated so that if the probability of defective for the wafer is (1−β), then it will be accepted only 100 α % of the time. The value of k is equal to $$\frac{t_{\alpha, \sqrt{n} Z_\beta}}{\sqrt{n}},$$

where the constant $t_{\alpha, \sqrt{n} Z_\beta}$ is the 100α percentile of the noncentral t-distribution having a noncentral parameter $\sqrt{n} Z_\beta$ and a degree of freedom n−1, and $Z_\beta$ is the 100β percentile for the standard normal distribution. α and β are specified by the customer and usually take the values of 0.95 and 0.975, respectively.

A drawback of prior art wafer disposition methods based on normal distribution sampling is that they often assume the samples are randomly chosen from the same normal population and ignore the systematic errors. However, due to manufacturing constraints, the locations of the test points 16 generally must remain the same from one wafer to another. Unfortunately, the misalignment of any test point 16 is highly dependent on its location on the wafer 7. For example, the test points 16 near an edge 17 of the wafer 7 tend to have a higher rate of misalignment errors than those near its center. The test points 16 are thus not necessarily representative of the remaining sliders 15 on the wafer 7.

As an example, FIG. 5 illustrates a three-dimensional graph of a typical distribution of the misalignment errors of a wafer 7 used in the manufacturing of magneto-resistive heads for data storage systems. The graph of FIG. 6 shows in general that the sliders 15 near the wafer edge have a higher rate of misalignment errors than those closer to the center of the wafer. This error difference is illustrated, for instance, by a high point 30 and low point 31. The points 30 and 31 correspond respectively to a slider near the edge of the wafer and a slider near its center.

Since systematic errors are not included in prior art acceptance sampling methods, the resulting disposition of a wafer may not be accurate. That is, the underkill and overkill rates for the wafers 7 may be unnecessarily increased. For instance, if the test points 16 are located closer to the edge 17 of the wafer 7, the method will have a high overkill rate and reject more wafers than necessary. On the other hand, if the test points 16 are located in the center of the wafer 7, the method will result in a high escape rate and more bad wafers are accepted.

Another drawback of prior art wafer disposition techniques based on normal distribution sampling is that the samples do not accurately reflect the actual distribution of the misalignment errors of a typical wafer. This is due to the fact that the misalignment of a randomly chosen test point 16 is not normally distributed, but is actually a mixture of thousands of normal distributions. FIG. 6 illustrates the normal distributions for individual test points 16, while FIG. 7 shows the combined distribution of the misalignment errors for all sliders 15. Due to the inaccuracy of normal distribution sampling in this case, prior art wafer disposition methods based on such a sample may result in an inaccurate disposition of the wafers.

Moreover, in an actual manufacturing environment, it is desirable that a wafer disposition method must be sufficiently simple so that it can be can be easily implemented and incorporated into the manufacturing process.

In the paper "*Normal Distribution Tolerance Limits for Stratified Random Samples,*" R. W. Mee addressed the problem of normal distribution sampling above by proposing methods for computing tolerance limits from a stratified random sample. However, the proposed methods cannot be applied to the present wafer disposition situation because they can only be used for wafers with a very small number of sliders, such as those having less than 10 sliders.

For a stratified random sampling, the sampled population is divided into nonoverlapping groups or strata. In a wafer disposition application, the strata would be the test points or sliders on the wafer. The proposed methods assumed that the characteristic of interest is normally distributed within each stratum and that the within-stratum variances are equal. Accordingly, the best approximate upper $\beta$-content tolerance limit is given as:

$$(\bar{d} \pm \hat{Z}_\beta cs) + t_\alpha(n-p)s[\sqrt{1/n + c^2 V}]^{0.5} \quad (1)$$

where $\bar{d}$ is the sample average, s is the standard deviation, n is the number of test points, p is the number of parameters in the model, and c is equal to $(1+1/n)^{0.5}$. The statistics $\hat{Z}_\beta$ an estimator of the standardized percentile and must be iteratively calculated for each sample using a root-finding routine, while the value of V is an estimate for the variance $\hat{Z}_\beta s/\sigma$. The number of terms in the expression (1) is proportional to the number of strata, which equals to n, the number of test points 16 on the wafer in this case.

Accordingly, a drawback of the proposed methods is that, because the calculation of the tolerance limits are very computationally intensive, they can not be generalized to a mixture of thousands of normal distributions for the randomly chosen wafer test points. The methods for computing tolerance limits described by R. W. Mee thus are not very practicable in an actual manufacturing environment. For a more detailed description on statistical tolerance limits, see, for instance, "*Statistical Intervals, A Guide for Practitioners,*" G. J. Hahn and W. Q. Meeker, Wiley, 1991.

Still other prior art techniques studied the related problem of finding tolerance limits (or intervals) for random-effect model. See, for example, "*Tolerance Intervals for the Distribution of True Values in the Presence of Measurement Errors,*" Technometrics, 36, No.2, pp.162–170, May 1994. However, these techniques donot provide a confidence limit for the combined probability of defective for all sliders in a wafer.

Therefore, there remains a need for a wafer disposition method that takes into account systematic errors in assessing the wafer-mask misalignment, provides an accurate disposition of the wafer with a confidence limit of the probability of defect for the wafer, and is sufficiently simple so that it can be easily implemented on-line in an actual manufacturing environment.

SUMMARY OF THE INVENTION

Accordingly, an object of the present invention is to provide an efficient method for wafer disposition in a photo-lithographic system, based on a variable acceptance sample, that guarantees a specified quality escape rate and confidence level.

Another object of the present invention is a disposition method that takes into account systematic errors caused by equipment operation in modeling the misalignment errors between the mask and a particular wafer, so as to improve the accuracy in the disposition of the wafer.

A further object of the present invention is to provide an acceptance sampling procedure that is sufficiently simple so that it can easily be implemented on-line in a typical photo-lithography system.

The present invention achieves the foregoing and other objects by providing a method, for use with a photo-lithographic system, for determining whether a wafer satisfies a predetermined product quality level using statistical modeling. Initially, the misalignment errors for a set of test points on the wafer are modeled as a mathematical model of the misalignment between the wafer and the mask. Based on this model, a confidence limit of the probability of defect for the wafer is generated. This confidence limit represents a level of certainty for the probability that wafer is defective. The method then determines whether the wafer satisfies the desired product quality level by comparing the confidence limit to a predetermined tolerance specification for that wafer.

In modeling the misalignment errors, the method takes into account the systematic errors associated with the operation of the lithography system, such as those caused by the mask alignment mechanism of the system. The misalignment model is used for generating the confidence limit for the probability of defective for the wafer. In addition, it may be used for aligning the wafer and the mask, relative to each other, for minimizing the systematic errors. Preferably, the systematic errors for the test points of the wafer are represented as a polynomial function of their positions on the wafer. Such a polynomial may be in a linear, quadratic, or cubic form. The goal is to select from these various polynomials a model that can predict the misalignment between the mask and another wafer most accurately. Due to the nature of the distribution of the misalignment errors, the quadratic model has been determined to be the best model for representing the systematic errors.

In accordance with the invention, the step of representing the errors as a polynomial includes estimating the parameters of the polynomial based on a linear regression (least square mean) technique such as one described below. Furthermore, the selection of the best model for the systematic errors includes the steps of calculating a predicted alignment for each test point based on the polynomial parameters, calculating a Bayesian information criteria (BIC) score for each polynomial, and selecting the polynomial with the lowest BIC score as the best model. Details on how the BIC score is obtained are provided below in the description of the preferred embodiment of the invention.

In accordance with the invention, the modeling of misalignment errors preferably also includes calculating, for each test point, a confidence limit for the probability that the test point is outside the tolerance specification. The confidence limit is based on a noncentral t-distribution of the misalignments of the test points.

Also, in generating the confidence limit of the probability of defective for the wafer, the method estimates a probability of defective for each slider of the wafer and combines the probabilities of defect for all sliders to obtain the confidence limit of the probability of defective for the wafer.

Finally, in determining whether the wafer satisfies the specified product quality level, the method performs a variable acceptance sampling procedure based on the model and tolerance specification for the wafer.

Additional objects and advantages of the present invention will be set forth in the description which follows, and in part will be obvious from the description and with the accompanying drawing, or may be learned from the practice of this invention.

DESCRIPTION OF THE PREFERRED EMBODIMENT

The invention is primarily described as a method for wafer disposition using a variable acceptance sampling procedure for use in a lithographic system. The described method may be used in electronic device manufacturing, or in any process in which a finished wafer is qualified based on the misalignment during fabrication, between the wafer and a device mask. However, persons skilled in the field of wafer disposition will recognize that an apparatus, such as a computer-based lithography system, including optical elements, a data processor, memory, I/O, program storage, a connecting bus, and other appropriate components, could be programmed or otherwise designed to facilitate the practice of the method of the invention. Such a system would include appropriate program means for executing the method of the invention.

Also, an article of manufacture, such as a pre-recorded disk or other similar computer program product, for use with a computer-based lithography system, could include a storage medium and program means recorded thereon for directing the lithography system to facilitate the practice of the method of the invention. Such apparatus and articles of manufacture also fall within the spirit and scope of the invention.

Figure 8:
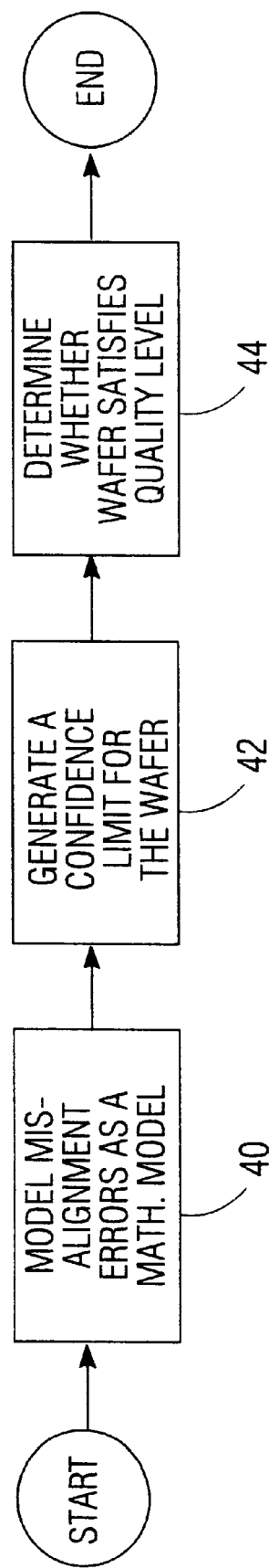
FIG. 8 is a flow chart showing the general operation of the method for wafer disposition in accordance with the present invention.

FIG. 8 is a high-level flow chart showing the general operation of the method for wafer disposition based on a variable acceptance sample, in accordance with the invention. Beginning with step 40, the misalignment errors between the wafer 7 and the device mask 6 used in the fabrication of the target devices are first modeled as a mathematical model. These misalignment errors may be assessed by measuring the superimposition errors corresponding to the wafer test points 16 using a specialized measuring instrument referred to earlier. The modeling step 40 is described in further detail below in accordance with FIGS. 9 through 11.

At step 42, the method generates a confidence limit of the probability of defective for the wafer 7, using the model created in step 40. This confidence limit indicates how well the model represents the misalignment between the wafer 7 and the mask 6. Details on the generation of the confidence limit are described further below. The method then determines, in step 44, whether the wafer 7 satisfies a specified product quality level by comparing the confidence limit of the probability of defective for the wafer to a predetermined tolerance specification for that wafer. Based on the result of this determination, the wafer 7 will be accepted or rejected accordingly.

Figure 1:
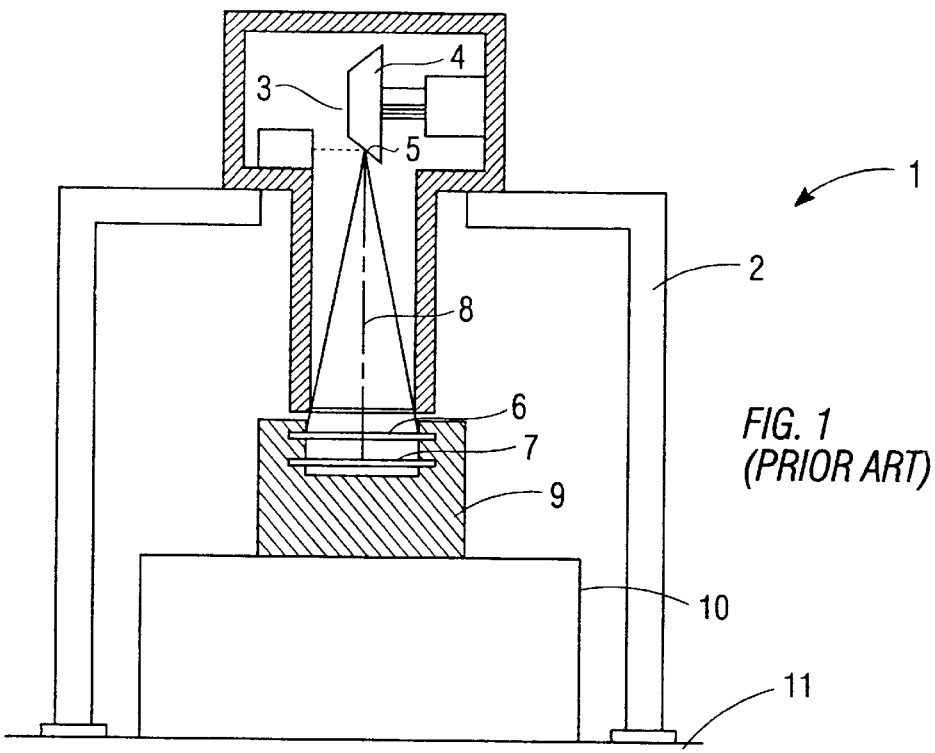
FIG. 1 illustrates a simplified block diagram of a prior art photo-lithography system in which the method of the invention may be practiced.
Figure 2:
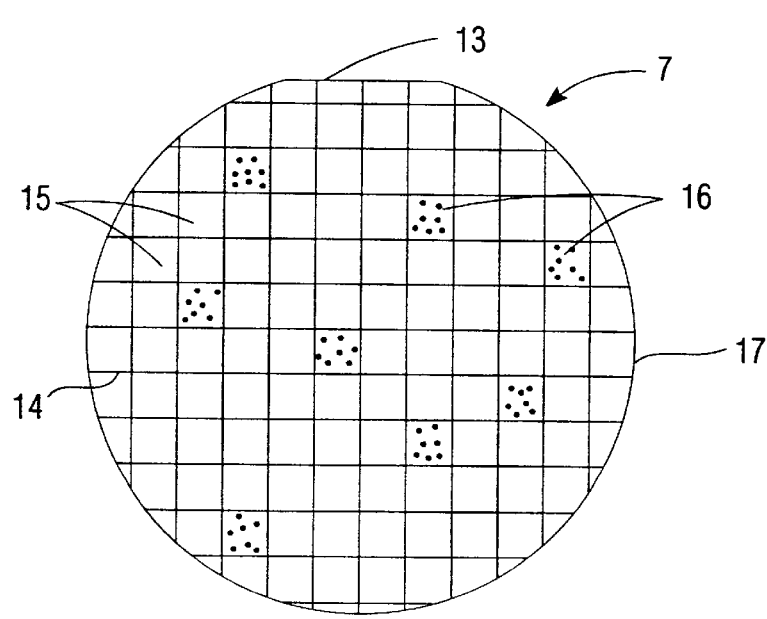
FIG. 2 shows a schematic drawing of a prior art wafer having a plurality of sliders and test points thereon.
Figure 3:
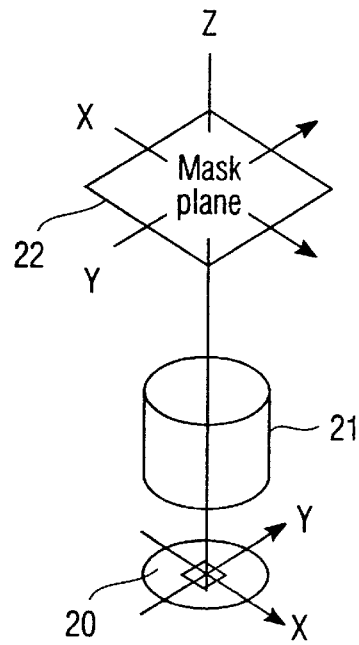
FIG. 3 illustrates the relative positions of a mask, lens assembly, and wafer located within the photo-lithography system of FIG. 1.
Figure 4:
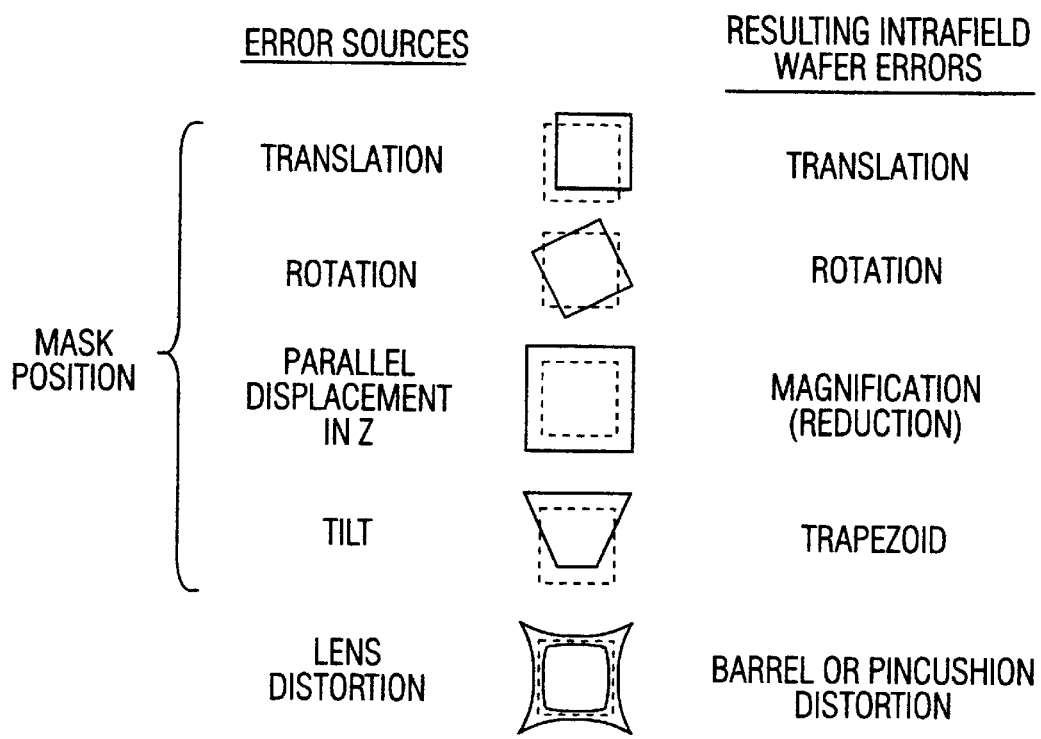
FIG. 4 illustrates exemplary types of misalignment between the mask and wafer shown in FIG. 3, and the respective sources of these misalignment types.
Figure 5:
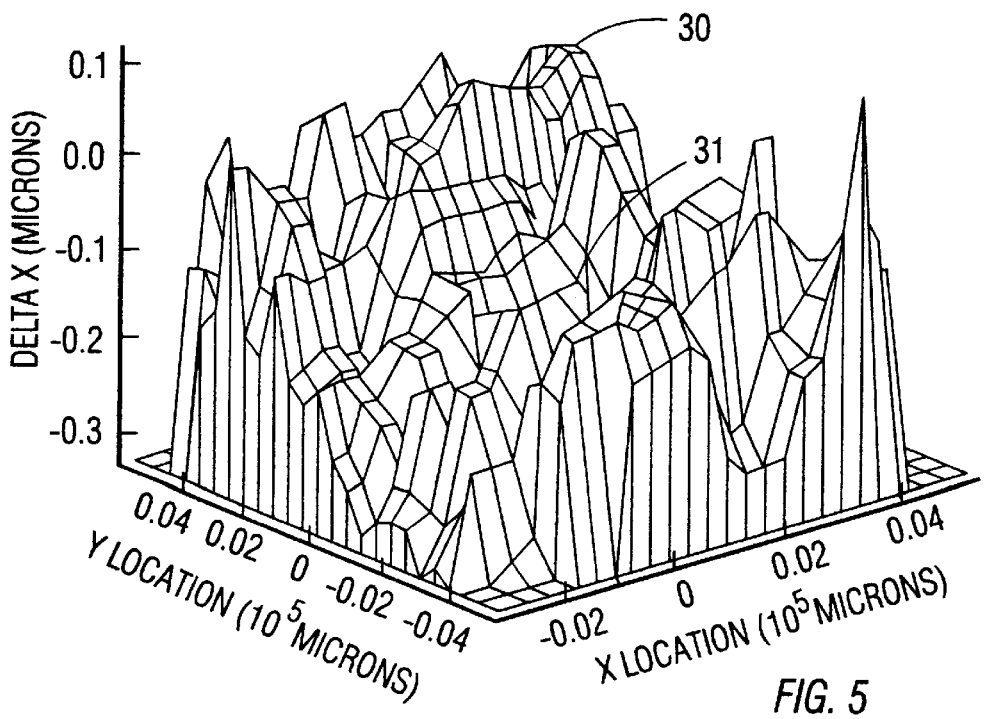
FIG. 5 shows a three-dimensional graph of the distribution of misalignment errors of the sliders as a function of their position on the wafer.
Figure 6:
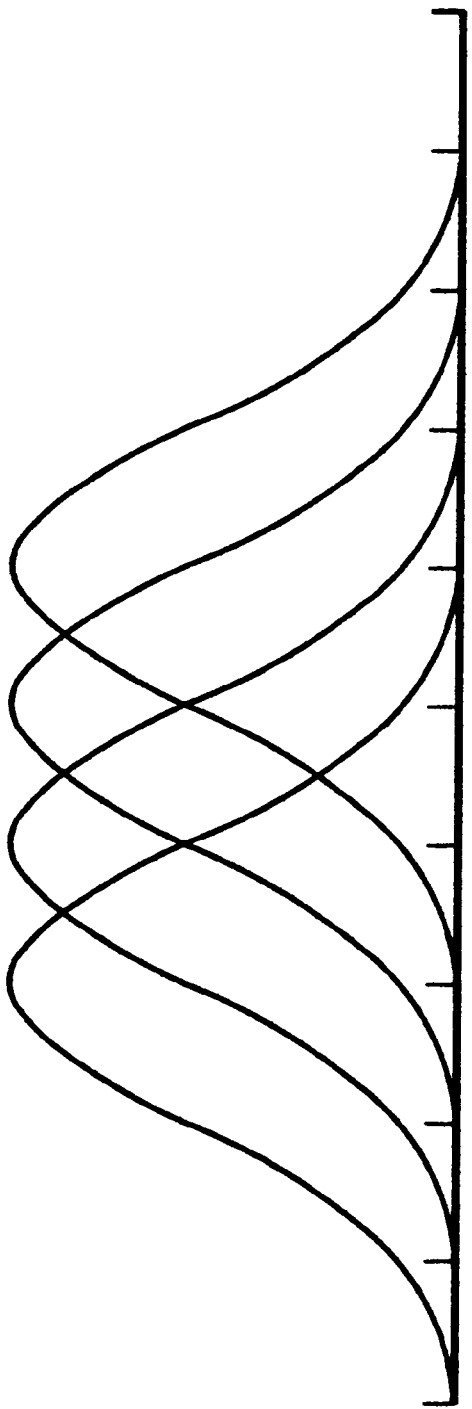
FIG. 6 exemplifies the normal distributions of individual sliders on the wafer shown in FIG. 2.
Figure 7:
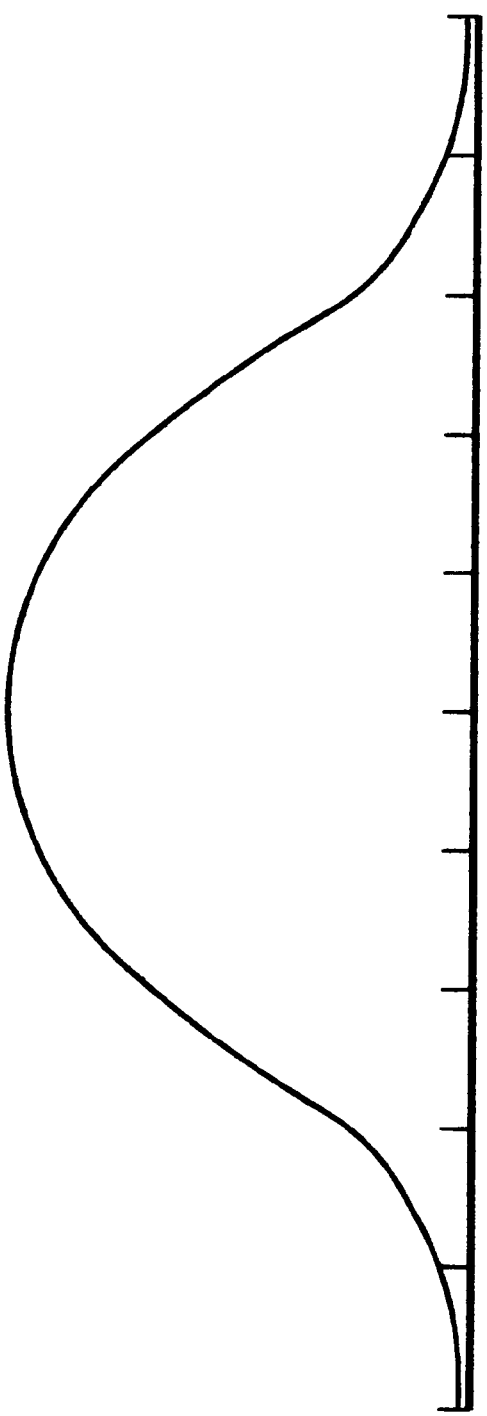
FIG. 7 illustrates the mixture of the normal distributions for individual sliders shown in FIG. 6.
Figure 9:
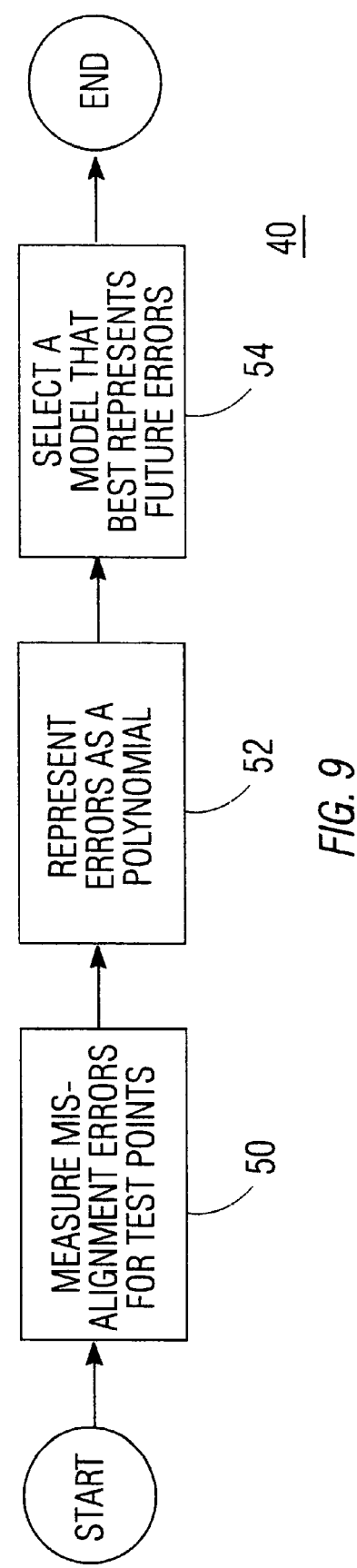
FIG. 9 is a flow chart showing further details for the step of modeling misalignment errors between the mask and wafer, from step 40 of FIG. 8.

FIG. 9 illustrates further details for the step of modeling the misalignment errors, from step 40 of FIG. 8. At step 50, the misalignments corresponding to a set of test points 16 on the wafer 7 are measured, using a specialized microelectronic measuring instrument such as the Quaestor Q2 system made by Bio-Rad Micromeasurements Inc. The measured misalignments include the systematic errors introduced in the operation of the equipment, such as the alignment mechanism 9 of the photo-lithographic system 1 in FIG. 1. The misalignment errors are then represented as a polynomial function of the positions of the test points on the wafer 7, as shown by step 52. Mathematically, the misalignments in each direction are assumed to have normal distributions with different means and same variance. In other words, $dx_i \sim N(\mu_x, \sigma^2)$ where $dx_i$ is the misalignment of the i-th test point in the x direction in the wafer plane 20, and the mean $\mu_x$ is given by:

$$\mu_{x_i} = \alpha_x + \beta_x x_i + \gamma_x y_i + \omega_x x_i y_i + \eta_x x_i^2 + \theta_x y_i^2$$

where $x_i$ and $y_i$ are the x and y locations of the i-th test point, and $\alpha_x$, $\beta_x$, $\gamma_x$, $\omega_x$, $\eta_x$, and $\theta_x$ are the parameters of the polynomial model. A similar model may be used for describing the misalignment in the y direction. That is, $dy_i \sim N(\mu_y, \sigma_y^2)$ and $$\mu_{y_i} = \alpha_y + \beta_y x_i + \gamma_y y_i + \omega_y x_i y_i + \eta_y x_i^2 + \theta_y y_i^2$$

where $x_i$ and $y_i$ are the x and y locations of the i-th test point, and $\alpha_y$, $\beta_y$, $\gamma_y$, $\omega_y$, $\eta_y$, and $\theta_y$ are the parameters of the polynomial model.

In order to find a model that best represents new misalignment data, i.e., one that predicts the misalignment errors between the mask and a new wafer the most accurately, several models are preferably considered. For instance, the constant, linear, quadratic, and cubic models may all be created. The method then selects from the various models one that best predicts the misalignments of a future wafer 7, in step 54.

Any of the model selection techniques known in the art may be used, such as cross-validation, Bayesian information criteria (BIC), or bootstrap methods. A description of the different model selection techniques may be found, for instance, in the text book "*Model Selection,*" by H. Linhart and W. Zucchini, Wiley, 1986. It has been determined that the quadratic model would generally predict new misalignment data for a wafer most accurately. On the other hand, the linear model may perform better for certain types of wafer. As a general case, the BIC selection method is preferably used for determining the best model for each wafer 7.

Even though the misalignment in the x direction can be modeled separately from the misalignment in the y direction, both sets of data are preferably considered in choosing the best model for the misalignment of the wafer. The selected model is one that best represents new misalignment data in both the x and y directions.

In addition, as part of the step of representing the misalignment errors as a polynomial function (step 52), the polynomial parameters (coefficients) are estimated, preferably using a linear regression technique. Regression analysis is a widely used statistical technique to relate the mean of a response variable (or dependent variable) to one or more explanatory variables (or independent variables). A description on different regression techniques may be found, for instance, in "*Introduction to Linear Regression Analysis,*" by D. C. Montgomery and E. A. Peck, Wiley, 1982. For example, using the least squares mean method, the parameters of a polynomial model may be estimated according to the procedure represented by the flow chart of FIG. 10.

Figure 10:
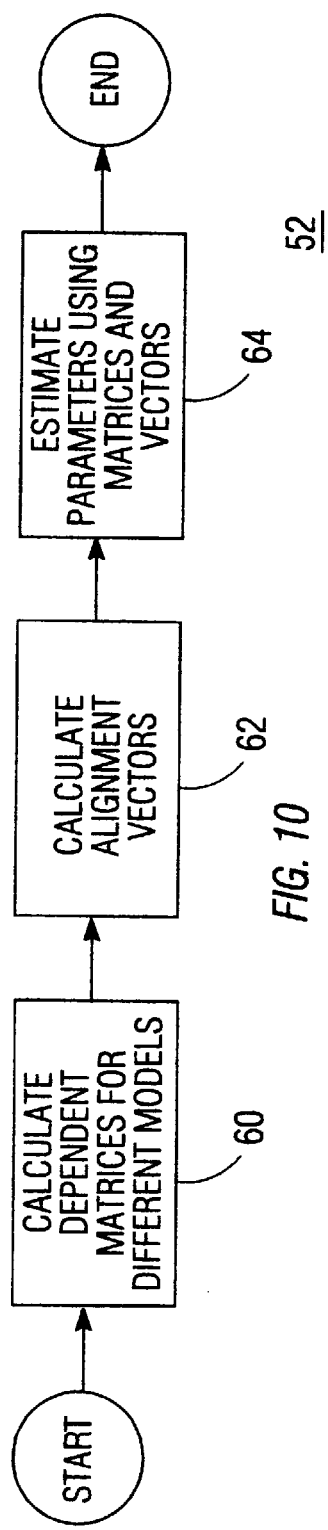
FIG. 10 is a flow chart showing further details for the step of representing the misalignment as a polynomial, from step 52 of FIG. 9.

In the following description with reference to FIG. 10, only the calculation results for the quadratic model are provided, but not for the simpler constant and linear models. Starting at step 60 of FIG. 10, dependent matrices $A_0 A_1$, and $A_2$, corresponding respectively to the constant, linear, and quadratic models, are calculated, using the measured misalignment data. In step 62, vectors Dx and Dy, representing the wafer misalignment in the x and y directions, are also calculated. For instance, the matrix $A_2$ for the quadratic model and vector Dx for n test points are given by:

$$A_2 = \begin{bmatrix} 1 & x_1 & y_1 & x_1 y_1 & x_1^2 & y_1^2 \\ 1 & x_2 & y_2 & x_2 y_2 & x_2^2 & y_2^2 \\ \vdots & \vdots & \vdots & \vdots & \vdots & \vdots \\ 1 & x_n & y_n & x_n y_n & x_n^2 & y_n^2 \end{bmatrix} \quad Dx = \begin{bmatrix} dx_1 \\ dx_2 \\ \vdots \\ dx_n \end{bmatrix}$$

where $x_i$ and $y_i$ are the locations of the i-th test point, and $dx_i$ is the misalignment of the i-th test point in the x direction. At step 64, the parameters $(\hat{\beta}x_0, \hat{\beta}y_0)$, $(\hat{\beta}x_1, \hat{\beta}y_1)$, and $(\hat{\beta}x_2, \hat{\beta}y_2)$ for the constant, linear, and quadratic models, respectively, are estimated based on the dependent matrices $A_0 A_1$, and $A_2$ and on the misalignment vectors Dx and Dy. For instance, the estimated parameter for the quadratic model is given by $8 \times 2 = (A'_2 A_2)^{-1} A'_2 Dx$. The notations $A^{-1}$ and $A'$ represent, respectively, the inverse and transposition of a matrix A.

Figure 11:
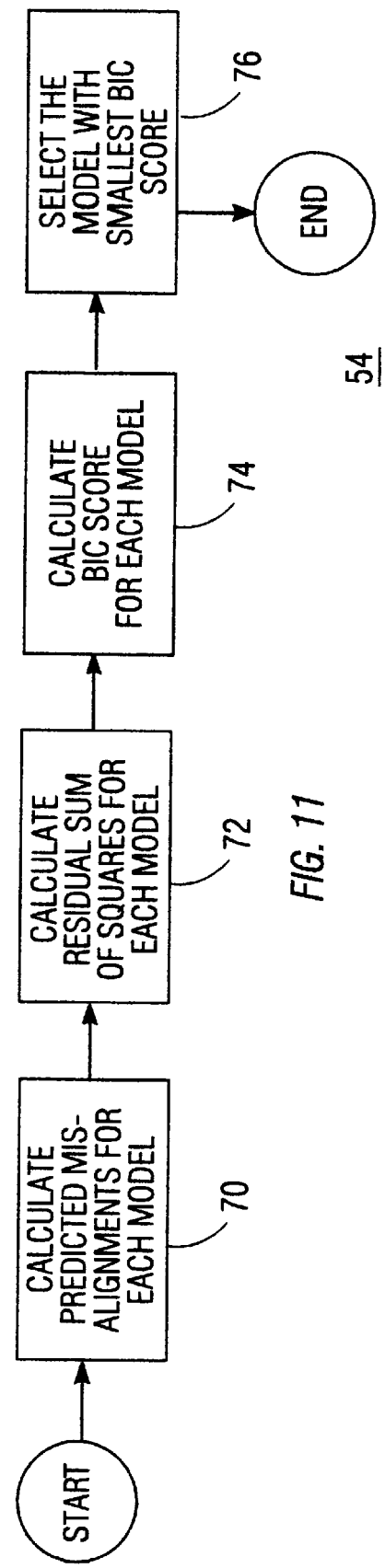
FIG. 11 is a flow chart showing further details for the step of selecting a model to best predict the misalignment errors of a future wafer, from step 54 of FIG. 9.

Referring now to FIG. 11, there is illustrated a flow chart showing further details for the step of selecting a polynomial model that best predicts the misalignment for another wafer, i.e., step 54 of FIG. 9. At step 70, predicted alignment vectors $(\hat{D}x_0, \hat{D}y_0)$, $(\hat{D}x_1, \hat{D}y_1)$, and $(\hat{D}x_2, \hat{D}y_2)$, corresponding respectively to the constant, linear, and quadratic models, are calculated for each test point 16 of the wafer 7. For example, the predicted alignment in the x direction for a test point 16 for the quadratic model would be $\hat{D}x_2 = A_2 \hat{\beta} x_2$. The method then calculates a Residual Sum of Squares for each model in step 72. The Residual Sum of Squares ($RSS_x$) in the case of the quadratic polynomial, for the misalignment in the x direction, is given by:

$$RSSx_2 = \sum_{i=1}^{n} (Dx_i - \hat{D}x_{2i})^2$$

where $Dx_i$ is the i-th element of the vector Dx and $\hat{D}x_{2i}$ is the i-th element of the vector $\hat{D}x_2$.

Next, in step 74, a combined Bayesian information criteria (BIC) score for each model based on the misalignments in both the x and y directions is calculated. A BIC score represents how accurately a model predicts new error data. A description on how the BIC score for a polynomial is computed may be found, for instance, in the text book "*Model Selection,*" by H. Linhart and W. Zucchini, Wiley, 1986. For instance, the BIC score for the quadratic model, for both directions, may be calculated as:

$$BIC_2 = n \ln\left(\frac{RSSx_2}{n}\right) + n \ln\left(\frac{RSSy_2}{n}\right) + 2P \ln(n)$$

where n and p are, respectively, the number of test points in the wafer and the number of parameters in the model. The method then selects among the different polynomials one with the smallest BIC score as the model representing the misalignments of the wafer, as shown by step 46. For example, if the quadratic model has the smallest BIC score, then $RSSx = RSSx_2$, $RSSy = RSSy_2$, p=6, $A_T = A_{T2}$, $\hat{\beta}x = \hat{\beta}x_2$, $\hat{\beta}y = \hat{\beta}y_2$, and $A = A_2$, etc. The calculation of the matrix $A_T$ is similar to that for $A_2$ above, except it includes all sliders 15 on the wafer 7.

Referring again to FIG. 8, further details for the step 42, for generating a confidence limit of the probability of defective for the wafer 7, are now described. To obtain the confidence limit of the probability of defective for the wafer, the method first estimates a respective confidence limit for each slider of the wafer. The confidence limits of the probability of defective for all the sliders on the wafer 7 are then combined to determine the confidence limit of the probability of defective for the wafer itself. For example, for each i-th slider 15 of the wafer, the 100 α % confidence limit PCIx$_i$ of the probability of the slider 15 being outside the upper and lower specification limits in the x direction is calculated as follows.

$$PCIx_i = 2 - \phi(Ux_i) - \phi(Lx_i)$$

where i=1, 2, . . . n for n test points.

$$Ux_i = \begin{bmatrix} Ap_{\alpha,n-p} \dfrac{USL_x - |\hat{D}x_{Ti}|}{SE_x} + Bp_{\alpha,n-p} C_{Ti} & \text{if } USL_x \geq |\hat{D}x_{Ti}| \\ An_{\alpha,n-p} \dfrac{USL_x - |\hat{D}x_{Ti}|}{SE_x} + Bn_{\alpha,n-p} C_{Ti} & \text{if } USL_x < |\hat{D}x_{Ti}| \end{bmatrix}$$

$$Lx_i = Ap_{\alpha,n-p} \dfrac{LSL_x - |\hat{D}x_{Ti}|}{SE_x} + Bp_{\alpha,n-p} C_{Ti}$$

Furthermore, the estimated escape rate may be calculated as follows:

$$Ex_i = 2 - \Phi\left(\dfrac{USL_x - |\hat{D}x_{Ti}|}{SE_x}\right) - \Phi\left(\dfrac{LSL_x - |\hat{D}x_{Ti}|}{SE_x}\right)$$

where USL$_x$ and LSL$_x$ are the upper and lower specification limits, respectively, the standard error SE$_x$ is equal to $$\sqrt{\dfrac{RSSx}{n-p}},$$

Dx$_{Ti}$ is the i-th element of vector DX$_T$, and C$_{Ti}$ is the i-th element of vector Cx$_T$. Constants Ap$_{\alpha, n-p}$, An$_{\alpha,n-p}$, Bp$_{\alpha,n-p}$, and Bn$_{\alpha,n-p}$ are given in Table 1 and depend on the confidence level a and the sample size n minus the number of parameters p of the model. The function $\phi$ is the standard normal function.

In the preferred embodiment of the invention, the escape probability confidence limit in the x direction for the entire wafer is then calculated by averaging the above confidence limits for all the sliders of the wafer as follows.

$$\text{Escape confidence limit in the } x \text{ direction} = \dfrac{1}{n_T} \sum_{i=1}^{n_T} PCIx_i$$

$$\text{Estimated escape rate in the } x \text{ direction} = \dfrac{1}{n_T} \sum_{i=1}^{n_T} Ex_i$$

Similarly, the escape probability confidence limit in the y direction for the entire wafer 7 can be calculated using the above procedure. The wafer 7 is accepted if the escape confidence limits in both directions are less than the guarantee escape rate specified by the customer, i.e., (1−α) in the previous notation.

Figure 12:
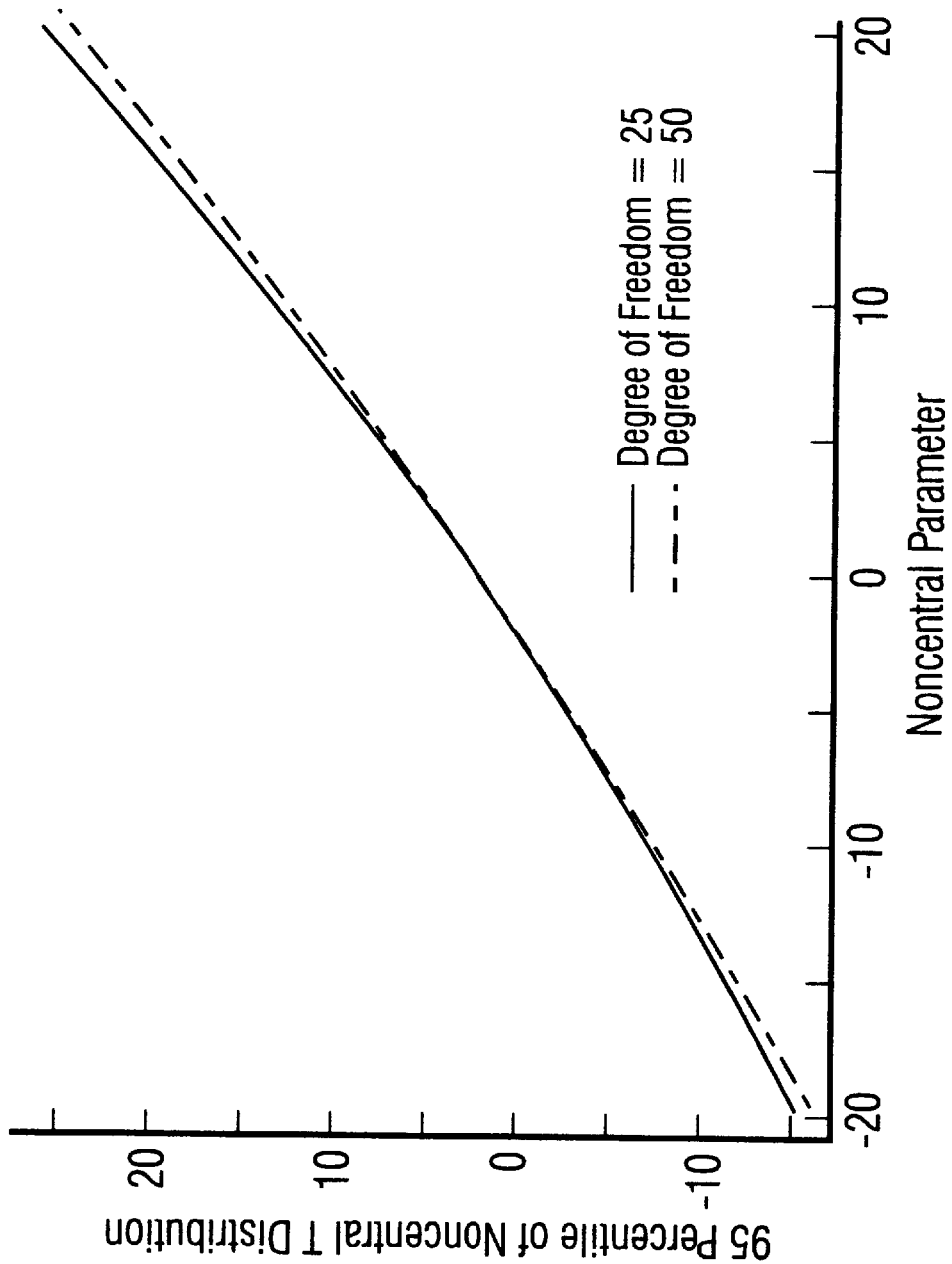
FIG. 12 is a graph of a representative noncentral t-distribution plotted against the noncentral parameter from which the constants of Table 1 can be estimated.

The construction of the confidence limit for the probability of defective for the wafer is now described. It is based on the noncentral t-distributions with noncentral parameter δ and degree of freedom n. While computing the noncentral t-distributions for all possible δ and n is not easy, storing all necessary noncentral t distributions is not an attractive solution either. Fortunately, in the range of δ that is of interest, the constants for the noncentral t distributions can be approximated as a piece-wise linear function of the noncentral parameter δ. Thus, only the slopes and intercepts of the approximated lines must be computed and stored. Table 1 below shows the estimated constants for the values of n from 30 to 50, from a representative noncentral distribution illustrated in FIG. 12.

TABLE 1

(Constants for the Noncentral t distributions)

| n | A$_p$ | B$_p$ | A$_n$ | B$_n$ |
|---|---|---|---|---|
| 30 | 0.8263695692 | −1.122293994 | 1.13146916 | −1.39283209 |
| 31 | 0.832873324 | −1.159482006 | 1.12879583 | −1.38663703 |
| 32 | 0.8340382204 | −1.144633871 | 1.12612259 | −1.40315521 |
| 33 | 0.8380037063 | −1.15192299 | 1.12478517 | −1.39474199 |
| 34 | 0.8412462237 | −1.158967096 | 1.12016313 | −1.41250435 |
| 35 | 0.845238467 | −1.185137203 | 1.11760863 | −1.41282863 |
| 36 | 0.8477972878 | −1.187021642 | 1.11954620 | −1.40002125 |
| 37 | 0.8497955075 | −1.177898195 | 1.11434647 | −1.40868189 |
| 38 | 0.8523481946 | −1.185976238 | 1.11123216 | −1.42343516 |
| 39 | 0.8550763125 | −1.197499384 | 1.10913021 | −1.42511434 |
| 40 | 0.8581718927 | −1.204269587 | 1.10655760 | −1.43487370 |
| 41 | 0.861318385 | −1.217251185 | 1.10688619 | −1.41666165 |
| 42 | 0.8625348521 | −1.210237792 | 1.10619682 | −1.41093012 |
| 43 | 0.8645855594 | −1.219712594 | 1.10178177 | −1.43015022 |
| 44 | 0.8675184592 | −1.221930317 | 1.09990896 | −1.44228867 |
| 45 | 0.8701524225 | −1.228859115 | 1.09929984 | −1.42838903 |
| 46 | 0.8715005905 | −1.242908975 | 1.09602874 | −1.45340502 |
| 47 | 0.874068243 | −1.246885059 | 1.09513773 | −1.45134216 |
| 48 | 0.8751000943 | −1.246411989 | 1.09440673 | −1.44478126 |
| 49 | 0.8771856105 | −1.25343977 | 1.09430181 | −1.44449804 |
| 50 | 0.8787377179 | −1.249926625 | 1.09243949 | −1.44552154 |

Based on the foregoing specification, the invention may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the invention. The computer readable media may be, for instance, a fixed (hard) drive, diskette, optical disk, magnetic tape, semiconductor memory such as read-only memory (ROM), etc., or any transmitting/receiving medium such as the Internet or other communication network or link. The article of manufacture containing the computer code may be made and/or used by executing the code directly from one medium, by copying the code from one medium to another medium, or by transmitting the code over a network.

An apparatus for making, using, or selling the invention may be one or more processing systems including, but not limited to, a photo-lithography system, computer, memory, storage devices, communication links and devices, servers, I/O devices, or any sub-components of one or more processing systems, including software, firmware, hardware or any combination or subset thereof, which embody the invention as set forth in the claims.

User input may be received from the keyboard, mouse, pen, voice, touch screen, or any other means by which a human can input data to a computer, including through other programs such as application programs.

One skilled in the art of wafer disposition will easily be able to combine the software created as described with appropriate general purpose or special purpose computer hardware to create a lithography system or sub-component embodying the method of the invention.

While several preferred embodiments of the invention have been described, it should be apparent that modifications and adaptations to those embodiments may occur to persons skilled in the art without departing from the scope and the spirit of the present invention as set forth in the following claims.

What is claimed is:

1. A wafer disposition method for use in a photo-lithography system having a mask, a wafer having a plurality of sliders, and means for obtaining misalignment data between the mask and wafer for a plurality of test points on the wafer, the method comprising the steps of:

modeling misalignment errors between the mask and wafer as a mathematical model using the misalignment data on the test points, said model being based on dependent matrices representing a constant model, a linear model, and a quadratic model of systematic errors;

estimating a probability of defect for each slider based on the model;

combining the probabilities of defect for all the sliders to generate a confidence limit of the probability of defect for the wafer;

determining whether the wafer satisfies a predetermined product quality level by comparing the confidence limit to a predetermined tolerance specification for the wafer, and accepting or rejecting the wafer based on said determination.

2. The method as recited in claim 1, wherein the step of modeling misalignment errors includes modeling systematic errors associated with the operation of the system.

3. The method as recited in claim 2, further comprising the step of aligning the mask and wafer, relative to each other, for minimizing the systematic errors, the step of aligning being based on the mathematical model.

4. The method as recited in claim 2, wherein the step of modeling systematic errors includes representing the systematic errors corresponding to the test points as a polynomial based on positions of test points on the wafer.

5. The method as recited in claim 4 further comprising the step of selecting, from different polynomials representing the systematic errors for the test points, a polynomial that best predicts the misalignment errors between the mask and another wafer, the step of selecting being based on Bayesian Information Criteria (BIC).

6. The method as recited in claim 5, wherein the selected polynomial is a quadratic function.

7. The method as recited in claim 4, wherein the step of representing the systematic errors as a polynomial includes estimating parameters of the polynomial using a linear regression technique.

8. The method as recited in claim 7, wherein:

the misalignment data are in x and y directions; and the step of estimating parameters includes the steps of:

calculating dependent matrices A0, A1, and A2 representing, respectively, a constant model, a linear model, and a quadratic model of the systematic errors;

calculating misalignment vectors Dx and Dy for all the test points, the vectors Dx and Dy corresponding respectively to the x and y directions; and estimating the parameters for each model using the matrices A0, A1, and A2, and the misalignment vectors Dx and Dy.

9. The method as recited in claim 7, wherein the step of selecting a polynomial that best predicts the misalignment errors includes the steps of:

calculating a predicted misalignment for each test point based on the parameters;

calculating a Residual-Sum-of-Squares for each polynomial using the predicted misalignments for all the test points on the wafer;

calculating a BIC score for each polynomial; and selecting a polynomial with the lowest BIC score as the mathematical model representing the misalignments errors between the mask and the wafer for both x and y directions.

10. The method as recited in claim 1, wherein the step of determining includes performing a variable acceptance sampling procedure based on the mathematical model and the tolerance specification for the wafer, the variable acceptance sampling procedure specifying that the wafer is of an acceptable quality if the confidence limit for the probability of defective for the wafer is within the tolerance specification, so as to achieve a specified escape rate for any particular confidence.

11. The method as recited in claim 1, wherein the confidence limit is based on a noncentral t-distribution of the misalignments of the test points.

12. The method as recited in claim 11, wherein:

the noncentral t-distribution has a noncentral parameter associated therewith; and the step of generating a confidence limit includes approximating the confidence limit by a piece-wise linear function of the noncentral parameter.

13. A computer program product for use with a computer-based photo-lithography system for wafer disposition, the system having a mask, a wafer having a plurality of sliders, and means for obtaining misalignment data between the mask and wafer for a plurality of test points on the wafer, the computer program product comprising:

a computer readable medium;

means, provided on the computer-readable medium, for directing the system to model misalignment errors between the mask and wafer as a mathematical model using the misalignment data on the test points, said model being based on dependent matrices representing a constant model, a linear model, and a quadratic model of systematic errors;

means, provided on the computer-readable medium, for directing the system to estimate a probability of defect for each slider based on the model;

means, provided on the computer-readable medium, for directing the system to combine the probabilities of defect for all the sliders to generate a confidence limit of the probability of defect for the wafer;

means, provided on the computer-readable medium, for directing the system to determine whether the wafer satisfies a predetermined product quality level by comparing the confidence limit to a predetermined tolerance specification for the wafer; and means, provided on the computer-readable medium, for directing the system to accept or reject the wafer based on said determination.

14. The computer program product as recited in claim 13, wherein the means for directing to model misalignment errors includes means, provided on the computer-readable medium, for directing the system to model systematic errors associated with the operation of the system.

15. The computer program product as recited in claim 14, further comprising means, provided on the computer-readable medium, for directing the system to align the mask and wafer, relative to each other, for minimizing the systematic errors, the alignment being based on the mathematical model.

16. The computer program product as recited in claim 14, wherein the means for directing to model systematic errors includes means, provided on the computer-readable medium, for directing the system to represent the systematic errors corresponding to the test points as a polynomial based on positions of test points on the wafer.

17. The computer program product as recited in claim 16 further comprising means, provided on the computer-readable medium, for directing the system to select, from different polynomials representing the systematic errors for the test points, a polynomial that best predicts the misalignment errors between the mask and another wafer, the selection being based on Bayesian Information Criteria (BIC).

18. The computer program product as recited in claim 17, wherein the selected polynomial is a quadratic function.

19. The computer program product as recited in claim 16, wherein the means for directing to represent the systematic errors as a polynomial includes means, provided on the computer-readable medium, for directing the system to estimate parameters of the polynomial using a linear regression technique.

20. The computer program product as recited in claim 19, wherein:
the misalignment data are in x and y directions; and
the means for directing to estimate parameters includes:
means, provided on the computer-readable medium, for directing the system to calculate dependent matrices A0, A1, and A2 representing, respectively, a constant model, a linear model, and a quadratic model of the systematic errors;
means, provided on the computer-readable medium, for directing the system to calculate misalignment vectors Dx and Dy for all the test points, the vectors Dx and Dy corresponding respectively to the x and y directions; and
means, provided on the computer-readable medium, for directing the system to estimate the parameters for each model using the matrices A0, A1, and A2, and the misalignment vectors Dx and Dy.

21. The computer program product as recited in claim 19, wherein the means for directing to select a polynomial that best predicts the misalignment errors includes:
means, provided on the computer-readable medium, for directing the system to calculate a predicted misalignment for each test point based on the parameters;
means, provided on the computer-readable medium, for directing the system to calculate a Residual-Sum-of-Squares for each polynomial using the predicted misalignments for all the test points on the wafer;
means, provided on the computer-readable medium, for directing the system to calculate a BIC score for each polynomial; and
means, provided on the computer-readable medium, for directing the system to select a polynomial with the lowest BIC score as the mathematical model representing the misalignments errors between the mask and the wafer for both x and y directions.

22. The computer program product as recited in claim 14, wherein the confidence limit is based on a noncentral t-distribution of the misalignments of the test points.

23. The computer program product as recited in claim 22, wherein:
the noncentral t-distribution has a noncentral parameter associated therewith; and the means for directing to generate a confidence limit includes means, provided on the computer-readable medium, for directing the system to approximate the confidence limit by a piece-wise linear function of the noncentral parameter.

24. The computer program product as recited in claim 13, wherein the means for directing to determine includes means, provided on the computer-readable medium, for directing the system to perform a variable acceptance sampling procedure based on the mathematical model and the tolerance specification for the wafer, the variable acceptance sampling procedure specifying that the wafer is of an acceptable quality if the confidence limit for the probability of defective for the wafer is within the tolerance specification, so as to achieve a specified escape rate for any particular confidence.

25. A wafer disposition apparatus for use with a photolithography system, the system having a wafer including a plurality of sliders, a mask for transferring device features to the wafer, and means for obtaining misalignment data between the mask and wafer for a plurality of test points on the wafer, the apparatus comprising:
means for modeling misalignment errors between the mask and wafer as a mathematical model using the misalignment data on the test points, said model being based on dependent matrices representing a constant model, a linear model, and a quadratic model of systematic errors;
means for estimating a probability of defect for each slider based on the model;
means for combining the probabilities of defect for all the sliders to generate a confidence limit of the probability of defect for the wafer;
means for determining whether the wafer satisfies a predetermined product quality level by comparing the confidence limit to a predetermined tolerance specification for the wafer; and
means for accepting or rejecting the wafer based on said determination.

26. The apparatus as recited in claim 25, wherein the means for modeling misalignment errors includes means for modeling systematic errors associated with the operation of the apparatus.

27. The apparatus as recited in claim 26, further comprising means for aligning the mask and wafer, relative to each other, for minimizing the systematic errors, the alignment being based on the mathematical model.

28. The apparatus as recited in claim 26, wherein the means for modeling systematic errors includes means for representing the systematic errors corresponding to the test points as a polynomial based on positions of test points on the wafer.

29. The apparatus as recited in claim 28 further comprising means for selecting, from different polynomials representing the systematic errors for the test points, a polynomial that best predicts the misalignment errors between the mask and another wafer, the selection being based on Bayesian Information Criteria (BIC).

30. The apparatus as recited in claim 29, wherein the selected polynomial is a quadratic function.

31. The apparatus as recited in claim 28, wherein the means for representing the systematic errors as a polynomial includes means for estimating parameters of the polynomial using a linear regression technique.

32. The apparatus as recited in claim 31, wherein:
the misalignment data are in x and y directions; and the means for estimating parameters includes:
- means for calculating dependent matrices A0, A1, and A2 representing, respectively, a constant model, a linear model, and a quadratic model of the systematic errors;
- means for calculating misalignment vectors Dx and Dy for all the test points, the vectors Dx and Dy corresponding respectively to the x and y directions; and
- means for estimating the parameters for each model using the matrices A0, A1, and A2, and the misalignment vectors Dx and Dy.

33. The apparatus as recited in claim 31, wherein the means for selecting a polynomial that best predicts the misalignment errors includes:
- means for calculating a predicted misalignment for each test point based on the parameters;
- means for calculating a Residual-Sum-of-Squares for each polynomial using the predicted misalignments for all the test points on the wafer;
- means for calculating a BIC score for each polynomial; and
- means for selecting a polynomial with the lowest BIC score as the mathematical model representing the misalignments errors between the mask and the wafer for both the x and y directions.

34. The apparatus as recited in claim 27, wherein the confidence limit is based on a noncentral t-distribution of the misalignment of the test points.

35. The apparatus as recited in claim 34, wherein:
- the noncentral t-distribution has a noncentral parameter associated therewith; and
- the means for generating a confidence limit includes means for approximating the confidence limit by a piece-wise linear function of the noncentral parameter.

36. The apparatus as recited in claim 25, wherein the means for determining includes means for performing a variable acceptance sampling procedure based on the mathematical model and the tolerance specification for the wafer, the variable acceptance sampling procedure specifying that the wafer is of an acceptable quality if the confidence limit for the probability of defective for the wafer is within the tolerance specification, so as to achieve a specified escape rate for any particular confidence.

* * * * *